United States Patent [19]

Frisbie et al.

[11] 4,413,722

[45] Nov. 8, 1983

[54] ARTICLE ORIENTATION DEVICE

[76] Inventors: Donald Frisbie, R.R. 1, Northfield, Minn. 55057; Larry D. Frisbie, Bricelyn, Minn. 56014; Joel J. Olson, 2836 Blackstone, St. Louis Park, Minn. 55416

[21] Appl. No.: 294,330

[22] Filed: Aug. 19, 1981

[51] Int. Cl.³ .............................................. B65G 47/24
[52] U.S. Cl. .................................. 198/392; 198/399; 198/395
[58] Field of Search ............... 198/392, 395, 396, 415, 198/627, 628, 822, 399; 130/33; 83/422, 356.3, 355; 144/245 R, 245 A

[56] References Cited

U.S. PATENT DOCUMENTS

| 2,598,190 | 5/1952 | Offutt | 198/627 |
|---|---|---|---|
| 2,973,548 | 3/1961 | Walker | 198/757 |
| 3,061,067 | 10/1962 | Liberty et al. | 198/382 |
| 3,224,554 | 12/1965 | Moulder et al. | 198/392 |
| 3,268,057 | 8/1966 | Ross et al. | 198/400 |
| 3,726,385 | 4/1973 | Sterling | 198/398 |
| 3,958,480 | 5/1976 | Rohde et al. | 83/422 |
| 4,073,377 | 2/1978 | Stoessel et al. | 198/624 |
| 4,187,545 | 2/1980 | Wallace et al. | 364/559 |
| 4,225,031 | 9/1980 | Frisbie et al. | 198/415 |

FOREIGN PATENT DOCUMENTS 2851683 6/1979 Fed. Rep. of Germany ........ 83/422

Primary Examiner—Jeffrey V. Nase
Assistant Examiner—Jonathan D. Holmes
Attorney, Agent, or Firm—James R. Cwayna

[57] ABSTRACT

A unit for the orientation of corn cobs to provide introduction of the ear of corn into a kernel stripping machine. An upper rotative member is provided for removal of the ears from a delivery conveyor with a lower wheel indexing and shifting the ear for proper orientation. A sensing and detecting unit controls the operation of the unit and determines the proper orientation of the cob.

17 Claims, 19 Drawing Figures

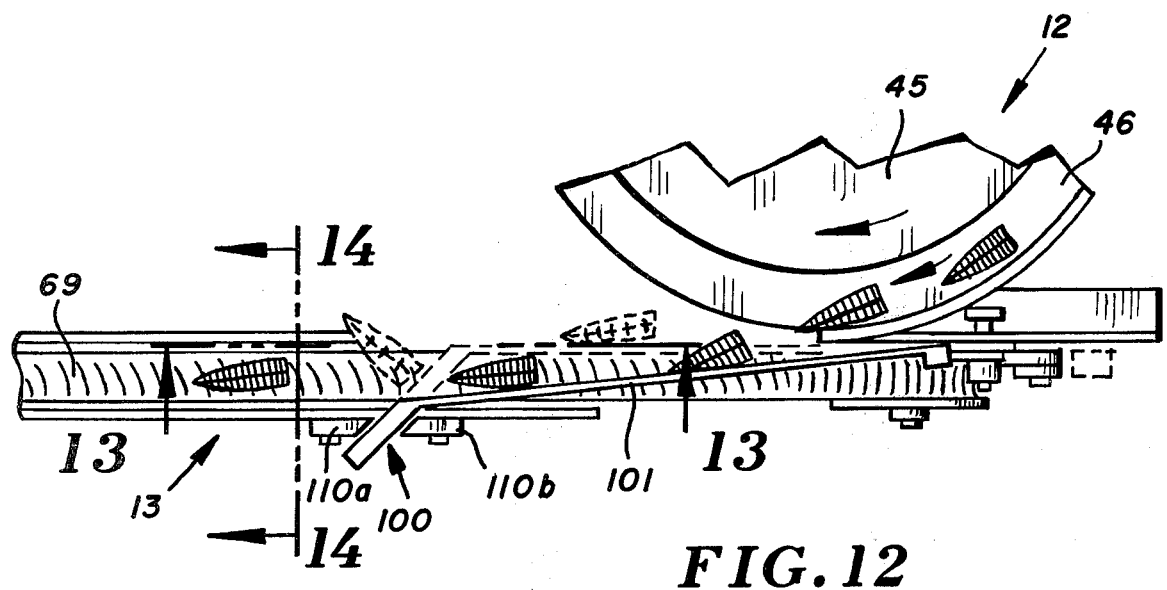
FIG.12
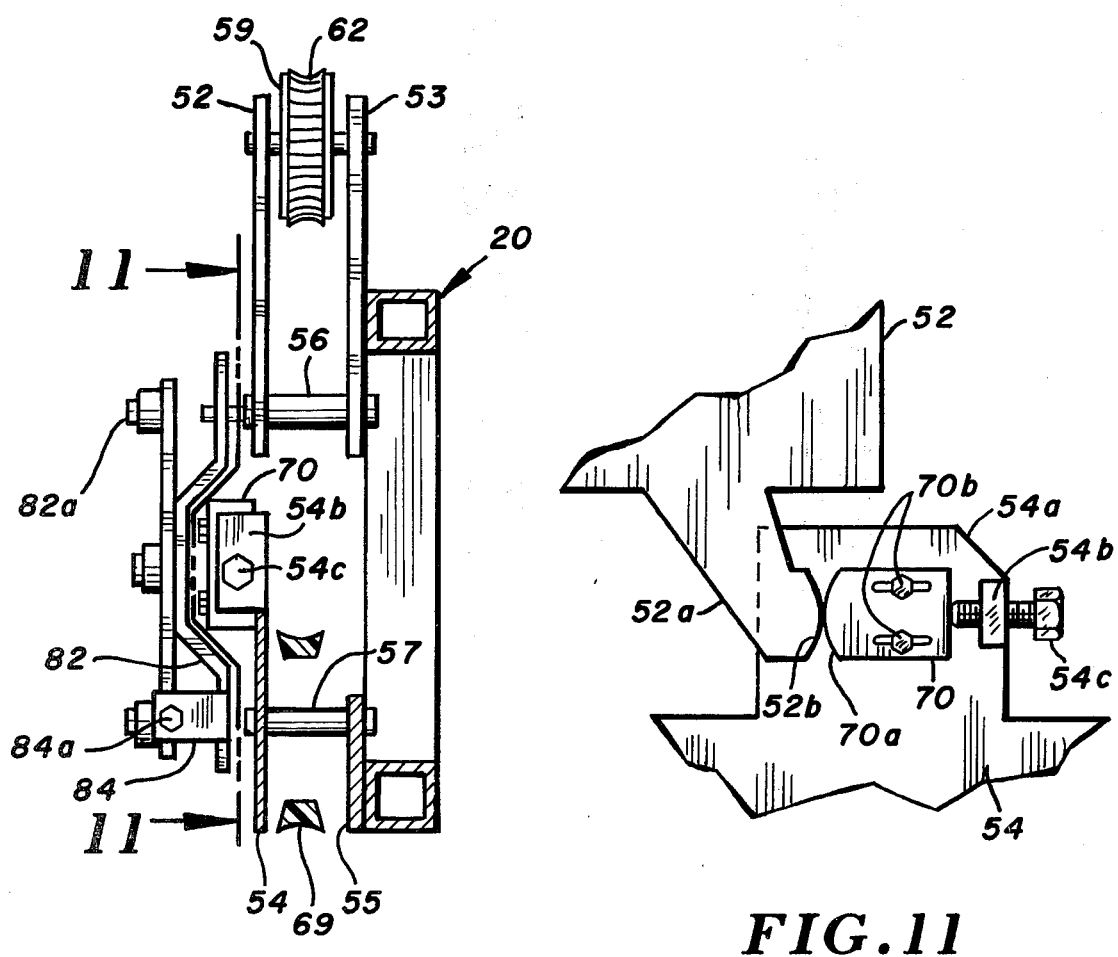
FIG.11
FIG.10

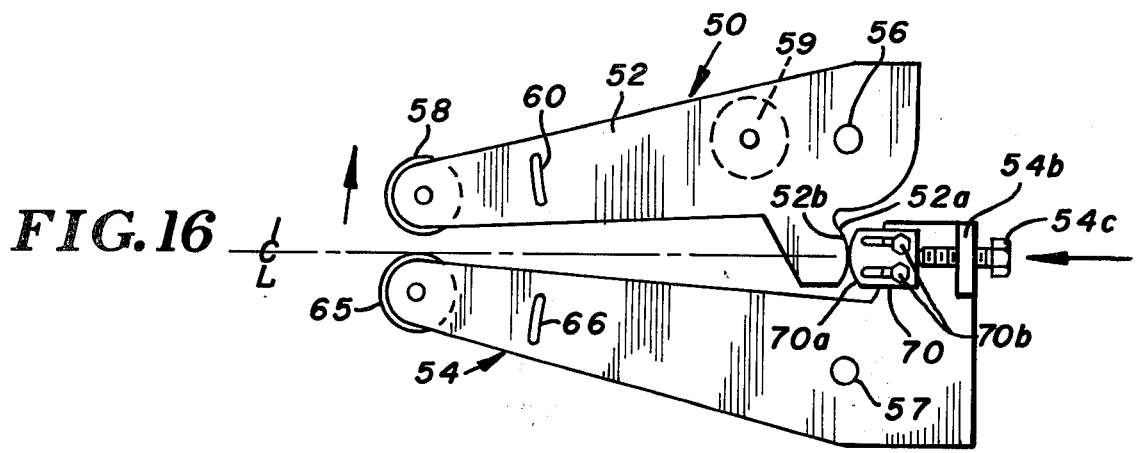
FIG.16
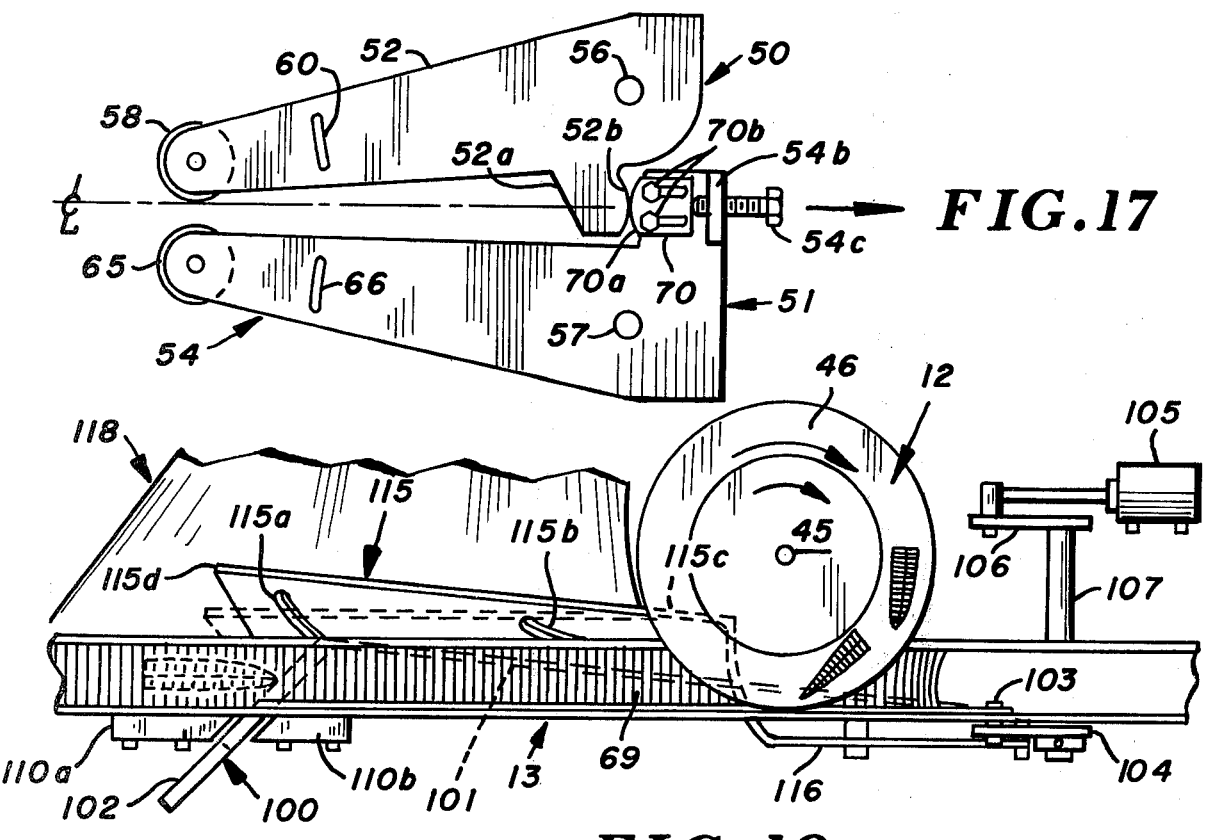
FIG.17
FIG.18
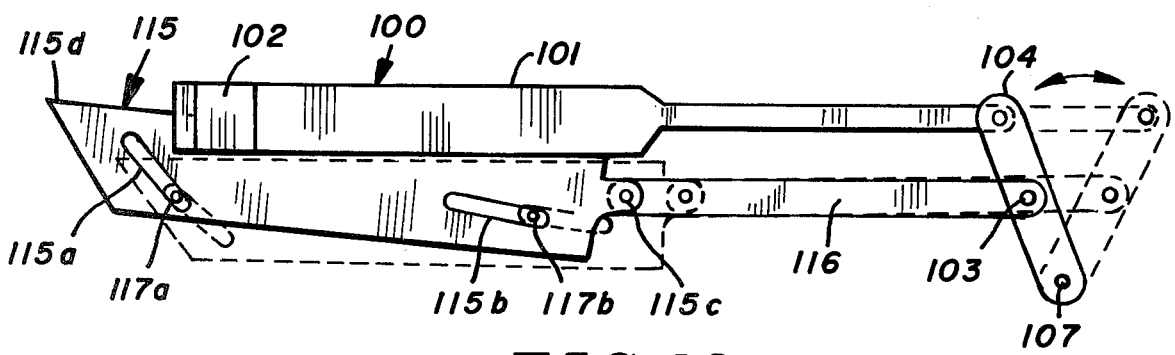
FIG.19

ARTICLE ORIENTATION DEVICE

FIELD OF THE INVENTION

This invention relates generally to a tapered article orientation device wherein articles, such as ears of corn, are delivered in a random orientation and which device orientates the ears of corn to a kernel removing unit and high speed arrangement with sensing devices being provided thereon to insure the delivery of the ears in a direction for proper operation of the kernel removing unit.

BACKGROUND AND OBJECTS OF THE INVENTION

This application is an improvement upon applicants' U.S. Pat. No. 4,225,031 issued Sept. 30, 1980 and entitled ARTICLE ORIENTATION DEVICE.

This prior art application forms, in the opinion of the applicants, the best art available as concerned with devices for the orientation of ears of corn to insure their proper feeding arrangement to a kernel stripping or cutting device. The art that was considered in the prosecution of this previous application and this application included patents to Moulder, U.S. Pat. No. 3,224,554; Walker, U.S. Pat. No. 2,973,548; Ross, U.S. Pat. No. 3,268,057; Sterling, U.S. Pat. No. 3,726,385; Liberty, U.S. Pat. No. 3,061,027; and Wallace et al, U.S. Pat. No. 4,187,545. These prior art patents were concerned with various aspects of orientation but were primarily governed with the orientation of articles which were of a common shape and size or which provided exterior elements which would allow grasping of the same for the determination of a specific position prior to orientation. The Wallace patent is directed to corn cob orientation but provides no double wheeled arrangement and the claims of the patent are particularly directed to the radiation detection beams for determining position. The applicants' device as disclosed herein includes a more positive feed control for rapidly feeding ears of corn for the stripping of ther kernels thereon in a metered fashion wherein the articles being fed are not of a constant nor positive continuous shape and with means to insure that clogging of the machine will not occur.

The standard operation of orientation of ears of corn is now manually performed. Manual operation will, over a long period of time, only result in the feeding of approximately sixty to eighty ears of corn per minute into a cutter. With the applicants' device, the ears are automatically fed into the cutter device and it has been found that this combination may more than triple the manual operation.

SUMMARY OF THE INVENTION

This invention includes an automatic device for obtaining ears of corn from a conveyor, metering and orientating the same into an arrangement such that all of the ears will be in a proper direction for feeding into a kernel stripping unit. The unit further includes methods for preventing clogging of the kernel stripping device and retraction of the ears from the kernel stripping device if clogging of the same should occur.

The device includes various wheels which will operate in conjunction with the conveyor element of the corn husker and which will direct the ears of corn in a proper and continuous flow into the final kernel stripping device. The unit includes several conveyor and rotating units and metering units which will provide a random delivery to an in-line delivery into the kernel stripping unit. Should the stripping unit be clogged, the applicants' device provides automatic reversing of the machine to clear itself of any clogged ears and thereafter to reinitiate forward motion.

It is therefore an object of the applicants' invention to provide an article orientation device particularly directed to the orientation of ears of corn into a kernel stripper or cutter element such that all the ears delivered thereto will be provided in a manner to insure proper operation of the kernel stripper cutting device.

It is a further object of the applicants' invention to provide an article orientation unit particularly directed to the orientation of ears of corn which is designed for usage with a mass conveyor element wherein the ears of corn are delivered in random orientation and to thereafter orientate such ears in a manner for proper feeding to a kernel stripping and cutting device.

It is a further object of the applicants' invention to provide an article orientation device particularly directed for the orientation of ears of corn wherein various sensing elements are arranged to initially determine the orientation of ears of corn and to select proper rotational effects to achieve a required in-line arrangement of the same for delivery to a kernel cutting or stripping device.

It is still a further object of the applicants' invention to provide an orientation device for ears of corn which will properly orient the same for delivery to a kernel cutting machine and which will reject ears that may not be of a desired size.

These and other objects and advantages of the applicants' invention will more fully appear from the following disclosure made in connection with the accompanying drawings in which the same numberal or indicia is used to designate the same or similar parts throughout the several views.

DESCRIPTION OF THE DRAWINGS

FIG. 10 is a view taken substantially along line 10—10 of FIG. 9 to illustrate the ear gauging mechanism for insuring delivery of ears of corn to the stripping unit;

FIG. 11 is a section taken substantially along line 11—11 of FIG. 10 to illustrate the adjustment device for positioning the driving conveyor for delivery of ears of corn to the stripping mechanism;

FIG. 12 is a section taken substantially along line 12—12 of FIG. 9 to again illustrate the mechanism for feeding and a return, kick-off mechanism for ears that may have been retracted from the kernel stripping mechanism;

FIG. 16 is a schematic illustration of a portion of FIG. 9 to illustrate the initial positioning of the delivery portion of the unit with respect to the kernel stripping unit to which the ears are being delivered;

FIG. 17 is a view similar to that of FIG. 16, again illustrating a portion of FIG. 9 and illustrating the positioning technique for initial positioning of the delivery portion of the unit with respect to the kernel stripping unit to which the ears are being delivered; both FIG. 16 and FIG. 17 incorporating the adjustment device as illustrated in FIG. 11;

FIG. 18 is a view illustrating a portion of FIG. 12 to an enlarged scale and illustrating the operation of the mechanisms of Both FIG. 12 and FIG. 13 which are brought into operation when the unit may become jammed and it is necessary to reverse the operation of the delivery section thereof to clear the kernel stripping mechanism; and, FIG. 19 is a schematic illustration basically taken from a side elevation of FIG. 18 which illustrates the combination of operations of elements to prevent further delivery of ears of corn to the stripping unit and to discharge ears of corn from the unit which ears have been retracted from the kernel cutting unit or which ears are on the delivery belt of the unit prior to delivery to the stripping unit.

DESCRIPTION OF A PREFFERED EMBODIMENT

Figure 1:
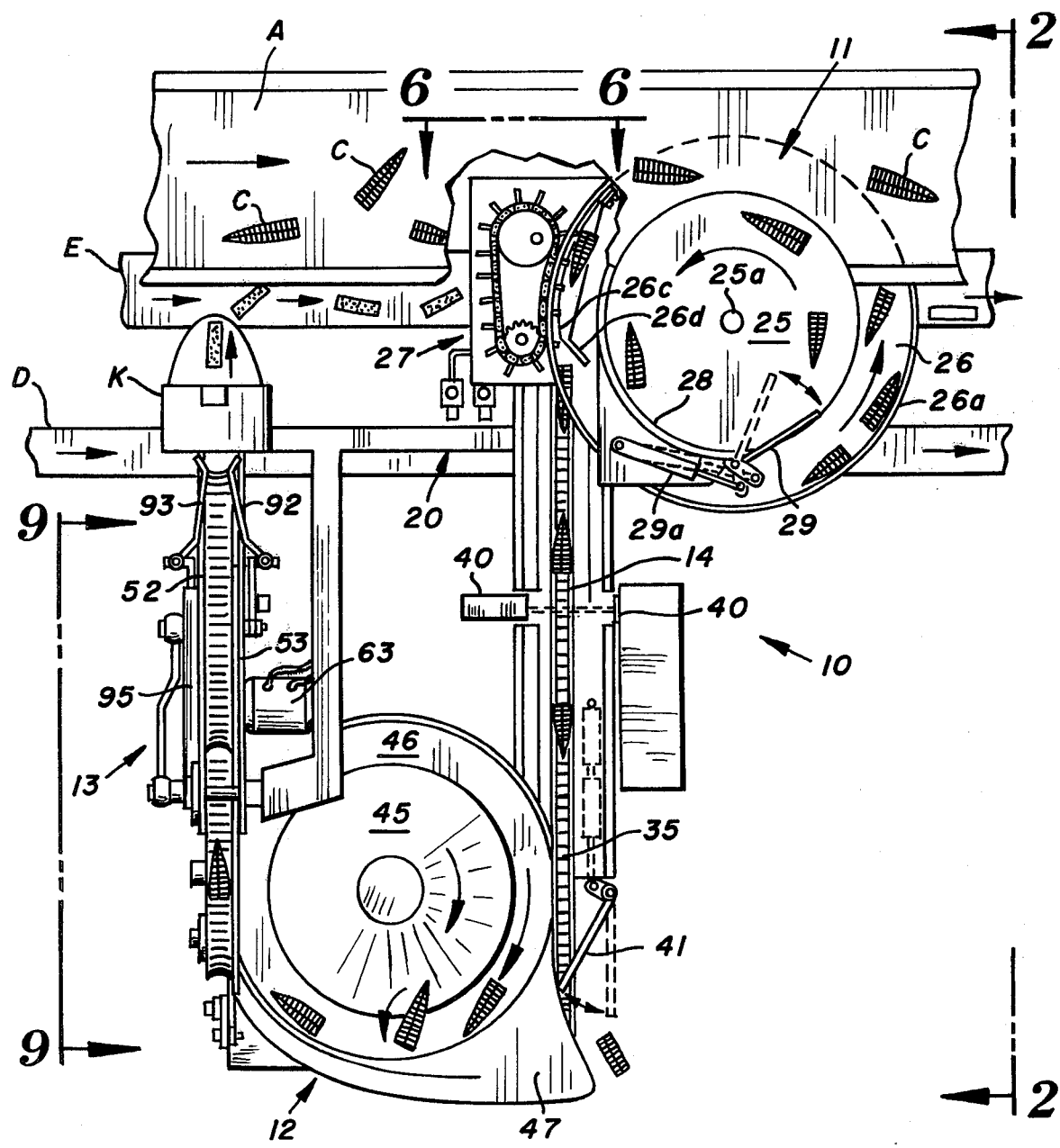
FIG. 1 is a top plan view of a typical installation of an article orientation device embodying the applicants' concepts and illustrating the conveyor element for delivery of ears of corn to the unit and further illustrating the kernel cutting operation.

In accordance with the accompanying drawings, the applicants' orientation device is designated 10 and basically includes an ear receiving and pick-off section 11, an orientation wheel 12 and a guiding and delivery conveyor 13. As best illustrated in FIG. 1, which is a top plan view of the unit 10, the unit is arranged to receive ears of corn C being delivered thereto in random fashion on a transport conveyor A which is at a first level and which has a portion of the receiving and pick-off section 11 arranged in common elevation with the conveyor A to receive the ears of corn C being delivered by the transport conveyor A and to deliver them in their random selection from the upper surface of the conveyor A to an underlying feed wheel which feed wheel includes a metering chain or feed device for their spaced delivery along a conveyor 14 to the orientation wheel 12 where the same are selectively oriented as is required from their initially directed delivery so that they may be fed along conveyor 13 to a kernel stripping and cutter knife section K for the stripping of the kernels from the cobs. It is essential in this cutting operation that all of the cobs be delivered in an orientation with the end of smaller diameter being inserted into the kernel stripping mechanism K in leading position and therefore, orientation is often necessary. This is due to the opening of the knifes in the cutter mechanism. In the form shown and in the arrangement illustrated in FIG. 1, a corn kernel conveyor D is arranged in underlying relationship to the cutter mechanism K for the delivery of the cut kernels for further processing and the stripped cobs are then delivered from the kernel cutting mechanism K onto an additional conveyor E for their delivery from the plant. The aspect of the invention is to eliminate the normal hand processing to feed the kernel cutting knife mechanism K and normally a series of the applicants' devices 10 would be arranged in adjacent side-by-side position along the conveyor A to accommodate the full flow of the ears of corn C that are being delivered by the conveyor A. Prior treatment of the ears renders them in husked fashion and normally the large stalks of the cobs are cut from the ears prior to their delivery onto the conveyor A.

The applicants' unit 10, then, is mounted upon a frame unit designated generally 20 which includes sufficient supports for the various mechanical operative devices of the unit and which also provides for adjustment to permit the unit 10 to be placed in proper elevated position with regard to the various conveyors upon which the uncut ears travel and upon which the cut kernels and stripped cobs travel. Various leveling devices would be provided for the positioning of the unit 10 and this aspect is not necessary to an understanding of the inventive portions hereof. With this frame structure 20, various drive mechanisms must be provided for the individual mechanical portions of the unit, and, although the applicants have provided a central hydraulic system for operating the individual hydraulic motors and drive mechanism of the unit, this same arrangement could easily be modified to provide for individual electric motors or other power systems without departing from the scope of the invention.

As illustrated in FIG. 1, the flow of the cobs of corn is along the conveyor A onto the pick-up mechanism 11 where, it should be noted, that the mechanism 11 describes and provides two individual wheels 25, 26 with the upper wheel 25 being arranged in overlying relationship to the conveyor belt A with the lower wheel 26 rotating in combination with wheel 25 and underlying the same a predetermined dimension which will permit the ear of corn to be received from conveyor A onto the upper pick-up wheel 25 and after rotation therewith will drop the cob onto the lower wheel 26 for ultimate delivery to the first conveyor section 14 after being metered through a paddle wheel member 27 which is arranged in overlying relationship to the lower wheel 26 and which paddle wheel member 27 is located on the outer periphery thereof.

The wheel members 25, 26 are driven through common axle 25a for simultaneously driving the same. Although on a common axle, the individual speeds of the two wheels may be controlled. This is common knowledge. The relative speed would vary on the basis of the load of conveyor A.

A selective portion of the upper wheel 25 is provided with an arcuate shroud 28 about a portion thereof in adjacent relation to the conveyor A such that the ears of corn that are picked up by wheel 25 will flow thereagainst for ultimate delivery to the lower wheel 26.

A control paddle member 29 is arranged in normal alignment with shroud 28 and is air actuated by cylinder 29a to normally be in line with shroud 28 and thereby allow ears to pass from the periphery of wheel 25 to drop onto wheel 26.

As illustrated in FIG. 1, this air actuated member 29 is shiftable to an inwardly direct position to force ears C inwardly of the wheel 25. The normal position of the lever 29 is to allow ears C to move outwardly of wheel 25 at the end of itself and thus drop to wheel 26. When there are any malfunctions of the unit 10, lever 29 is directed inwardly and will divert the ears C either for further rotation on wheel 25 or will direct the same back onto conveyor A. Member 29 then is a control lever that will prevent overcrowding of ears into the operative portions of the unit.

Figure 6:
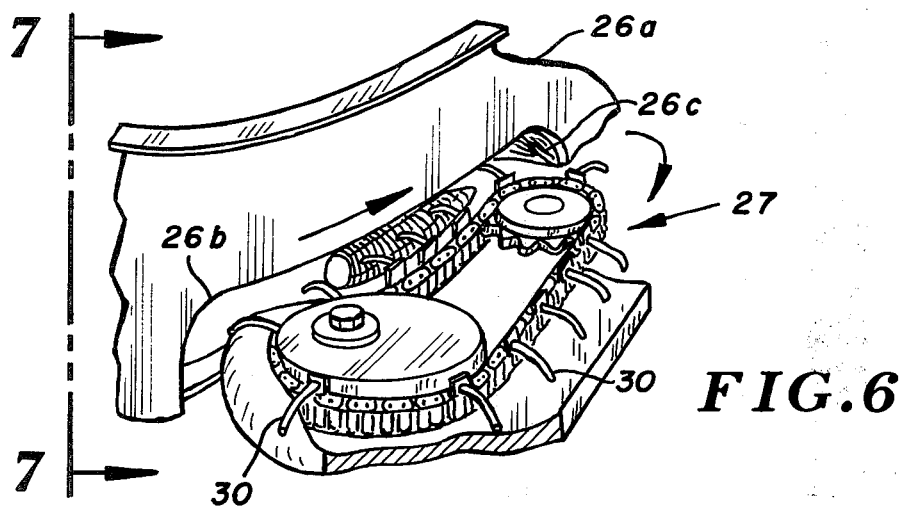
FIG. 6 is a view taken substantially along line 6—6 of FIG. 1 which illustrates to an enlarged detail the metering and feeding device for deliverying the ears of corn to the unit.
Figure 7:
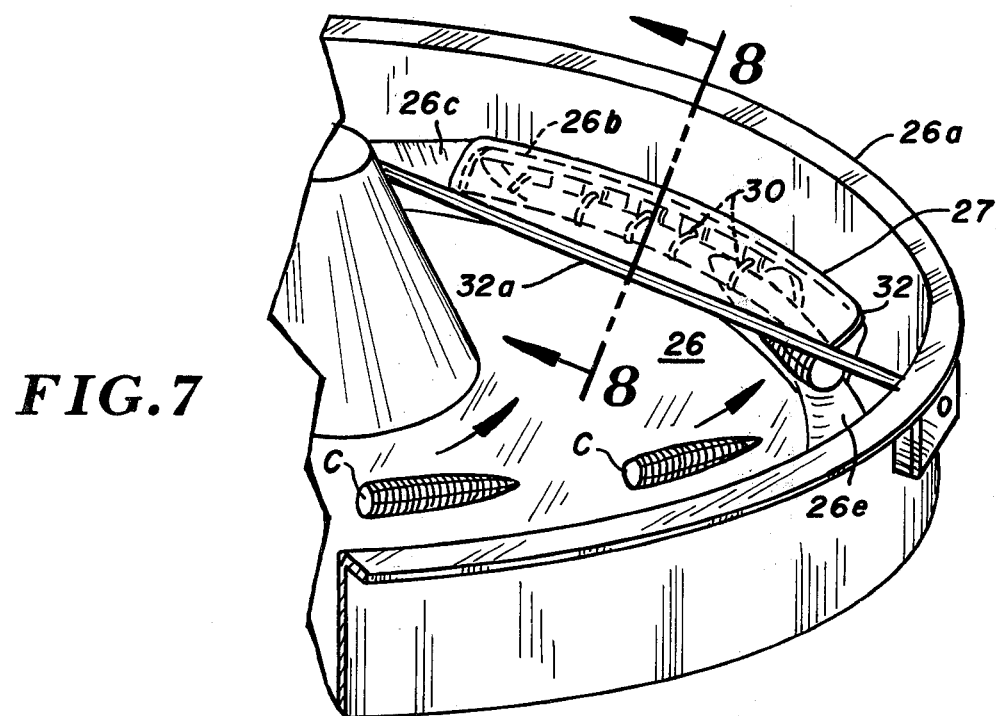
FIG. 7 is a view taken substantially along line 7—7 of FIG. 6 again illustrating the metering and feeding arrangement for delivery of ears of corn to the orientation unit.
Figure 8:
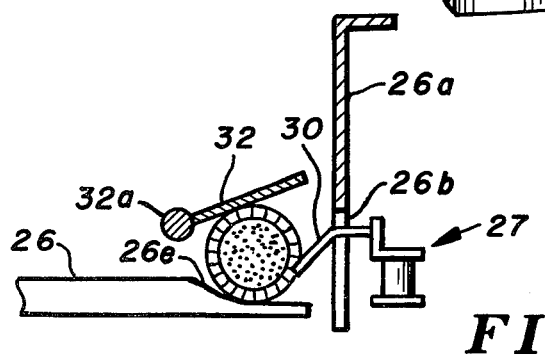
FIG. 8 is a section taken substantially along line 8—8 of FIG. 7 to illustrate the orientation arrangement for aligned delivery of the ears of corn.

Lower wheel 26 is provided with an arcuate shroud 26a extending substantially therearound such that the ears of corn will be driven in a counterclockwise direction and therefore ears of corn from wheel 25 will likewise be driven in a counterclockwise direction until the same pass adjacent to and are controlled by the metering chain unit 27. At this point in the shroud 26a, as best illustrated in FIGS. 6 and 7, the shroud 26a is broken at a selected portion 26b thereof to permit the metering wheel or metering chain 27 to be inwardly directed onto the wheel area. Also at this point, the shroud forms a delivery chute or chamber 26c to further guide the ears. Those ears not metered are driven inwardly by an inwardly directed shroud section 26d. Also, as best illustrated in FIGS. 7 and 8, a biasing paddle 32 is provided in chordlike fashion by shaft 32a to cover the extent of the chain exposing opening. This paddle 32 includes a torsionally biased mounting shaft 32a and the construction concept of this device is to provide a constant downwardly directed force for the ears as they pass the chain 27 and tooth 30 arrangement.

As also illustrated in FIG. 8, the wheel 26 is contoured or grooved about its outer periphery as at 26e which provides a more positive delivery device.

This metering arrangement is controlled for proper feeding and spacing of the ears into the remaining portion of the machine and control and timing thereof is obviously necessary for proper operation of the unit.

Figure 2:
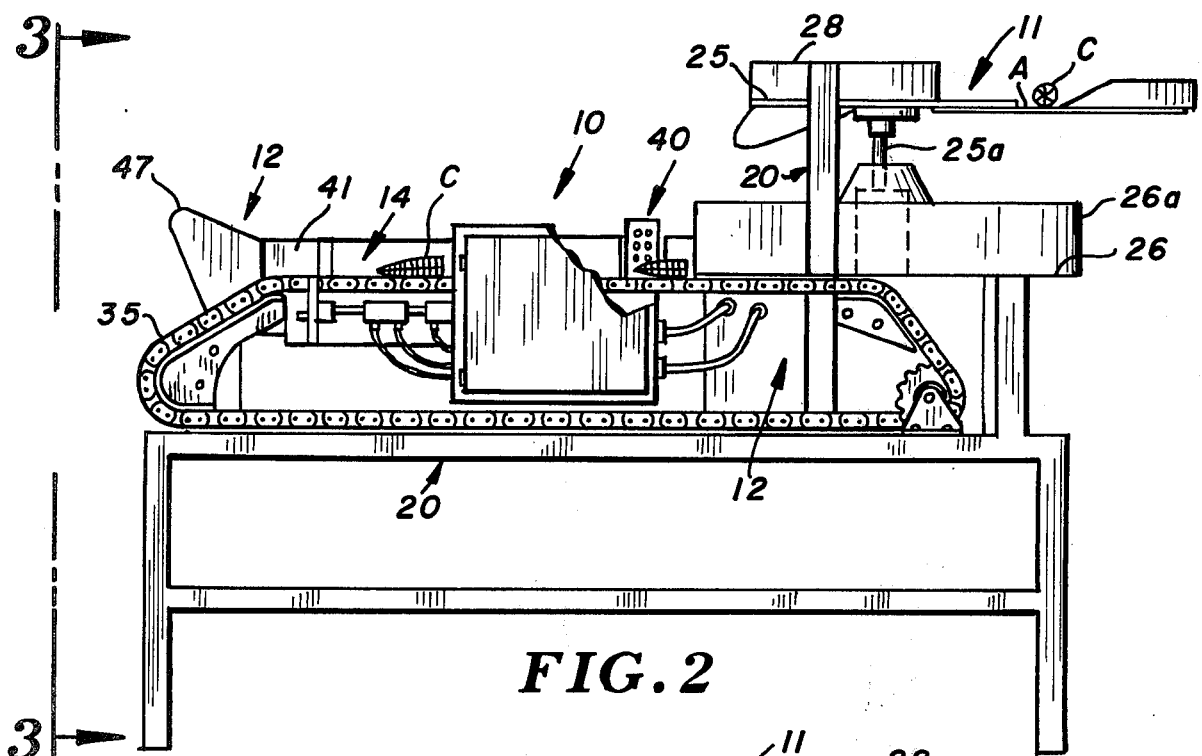
FIG. 2 is a vertical section taken substantially along line 2—2 of FIG. 1 which illustrates a side elevation of the orientation device.

As the ears of corn are delivered from the lower delivery wheel 26, the delivery chain and carrier thereof is best illustrated in FIG. 2 and has previously been designated 14. As illustrated in FIG. 2, a simple continuous chain mechanism 35 is provided having appropriate support wheels and the like to drive the same and elevate the same onto an in-line underlying relationship to the wheel 26 and for the delivery of the ears to the orientation device 12. As the ears of corn are carried by the upper run of the conveyor 14, they pass through a profile detector unit designated 40 which detector unit includes a photoelectric source and receiver unit arranged respectively on opposite sides of the conveyor belt 35 which unit is more particularly described in the aforementioned applicants' patent which is designed to correctly detect the orientation of the ear being carried by the conveyor unit. The necessity to determine this array is to actuate the rotation device 12 to either rotate the ear of corn being received thereon or to allow the same to continue in its travel in unoriented rotation. This profile detection unit 40 also senses the physical characteristics of the ear and will accept or reject the ears depending upon their physical characteristics. For example, certain ears of corn are misshapen, too large, too small or may include excessive stalk lengths which have not been trimmed. By allowing such ears to pass into the kernel cutting operation, other malfunctions could occur and therefore the conveyor 35 also includes in combination with this profile detection unit, a reject or control gate 41 at the end thereof which, on command by the profile detection unit 40 will allow ears to continue to travel directly off the conveyor 35 and not enter the orientation device 12 or proper ears are allowed to proceed in a normal flow onto the orientation device. As previously stated, this area including the orientation wheel arrangement is more thoroughly described in the applicants' previously mentioned patent.

Figure 3:
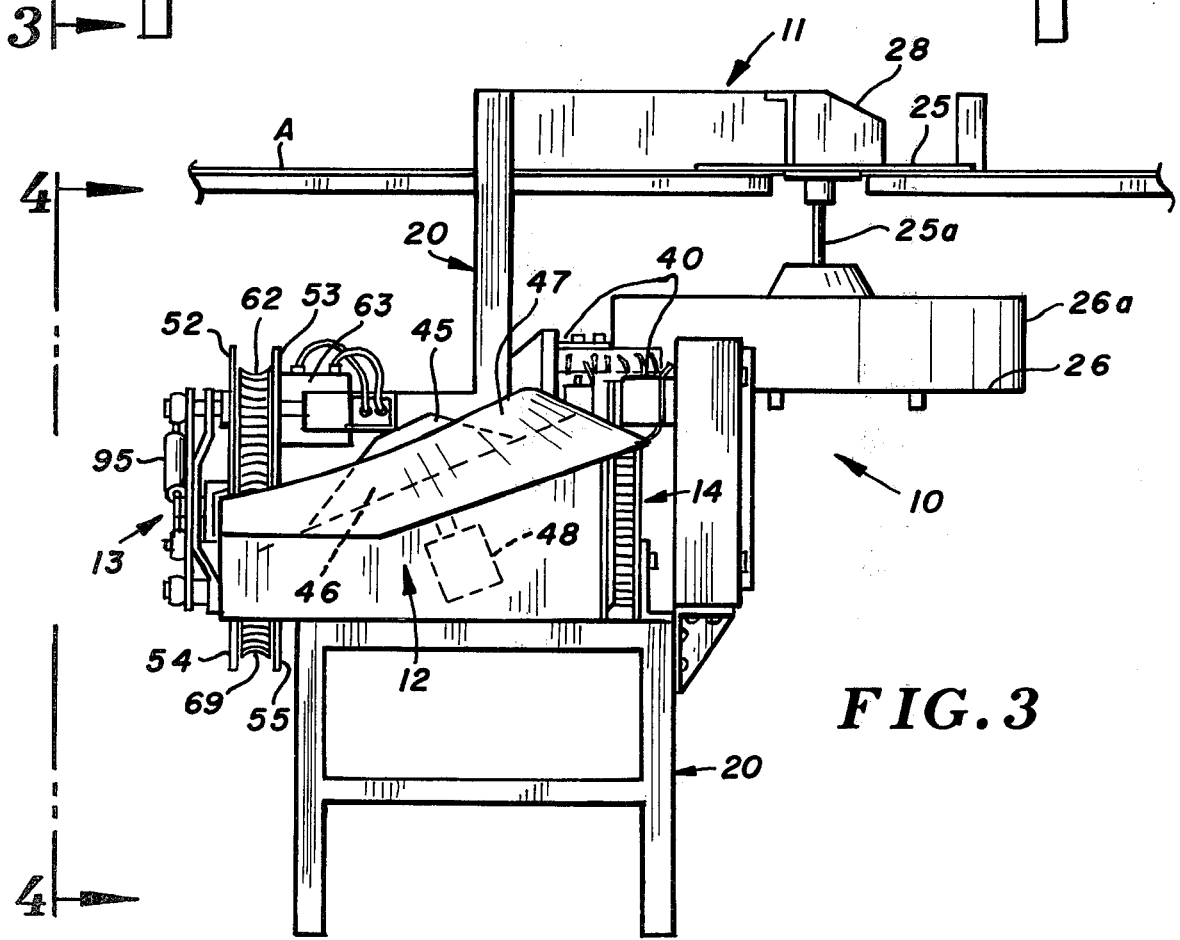
FIG. 3 is a vertical elevation taken substantially along line 3—3 of FIG. 2 taken from one end of the applicants' device.

As particularly illustrated in FIGS. 1, 2 and 3, the orientation device 12 includes a pair of wheels designated respectively 45, 46 with the inner such wheel 45 being conically shaped. As also illustrated in FIG. 3, these wheels 45, 46 are offset with regard to a horizontal position so that the conveyor 35 will deliver ears to an upper elevated portion thereof and the ears will move downwardly across the plane of the wheels 45, 46 to ultimately be delivered to the delivery conveyor portion 13 of the unit. A turning ramp 47 is also provided and the object of the entire orientation device in combination with the conveyor element 35 and the reject gate or control gate 41 is to allow improperly oriented ears to move onto the transfer ramp 47 where they will be directed by the driving conveyor 35 and the ramp, wheel combination and speed differentiation causes proper orientation. A differential motor, designated 48, provides two speeds to these wheels with the inner wheel 45 moving more rapidly than the outer wheel 46. This type of speed change aids in shifting the ears and rotating the same. Ears that are in the proper direction as they pass the control reject gate 41 are allowed to simply pass onto the outer wheel 46 and are maintained between the inner and outer wheels 45, 46. Gate 41 then performs several functions in conjunction with the profile detector unit and this is to respond in accordance with the reading that the profile unit has gained from the ear to allow the same to be directed onto the turning ramp 47, rejected and continue along the conveyor 35 or to simply be slid onto the outer wheel 46. At this point, then the ears that are being turned and carried by wheel member 46 are all oriented in a fashion to present their area of less diameter forwardly along the feed conveyor 13 and ultimately into the kernel stripping device K.

Figure 4:
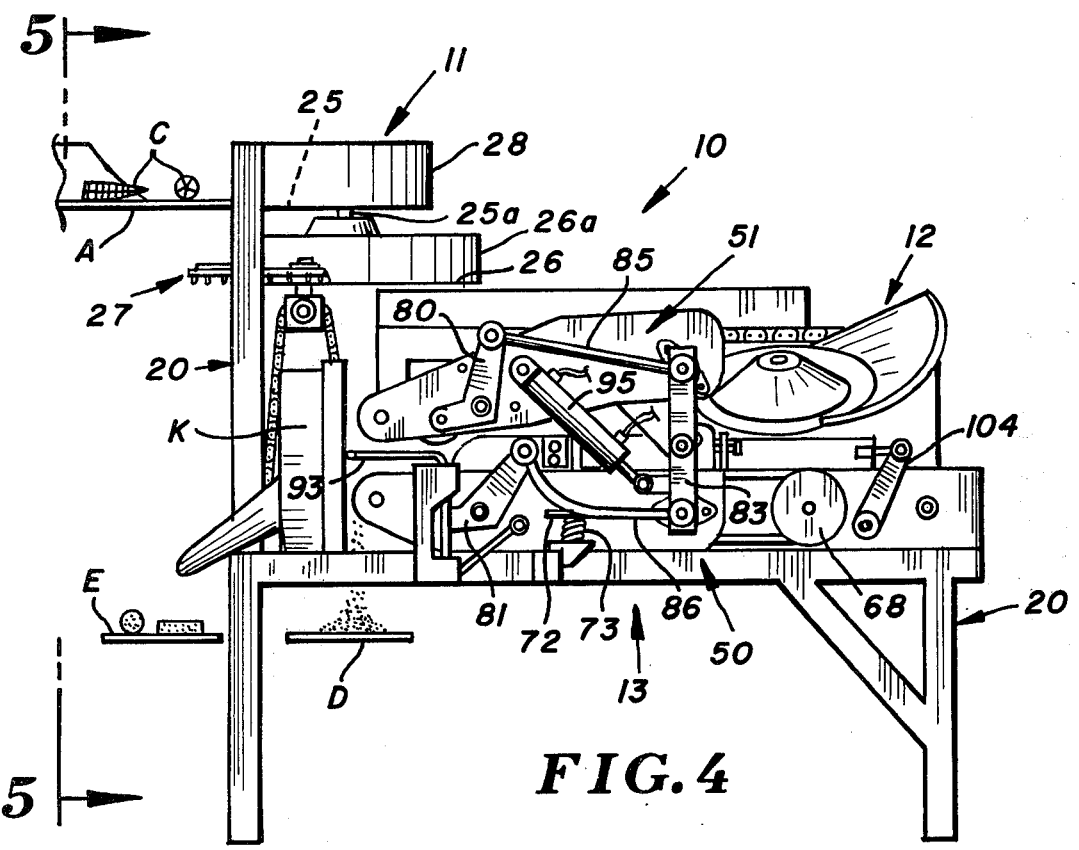
FIG. 4 is an elevation taken substantially along line 4—4 of FIG. 3 and which illustrates the delivery portion of the unit.
Figure 5:
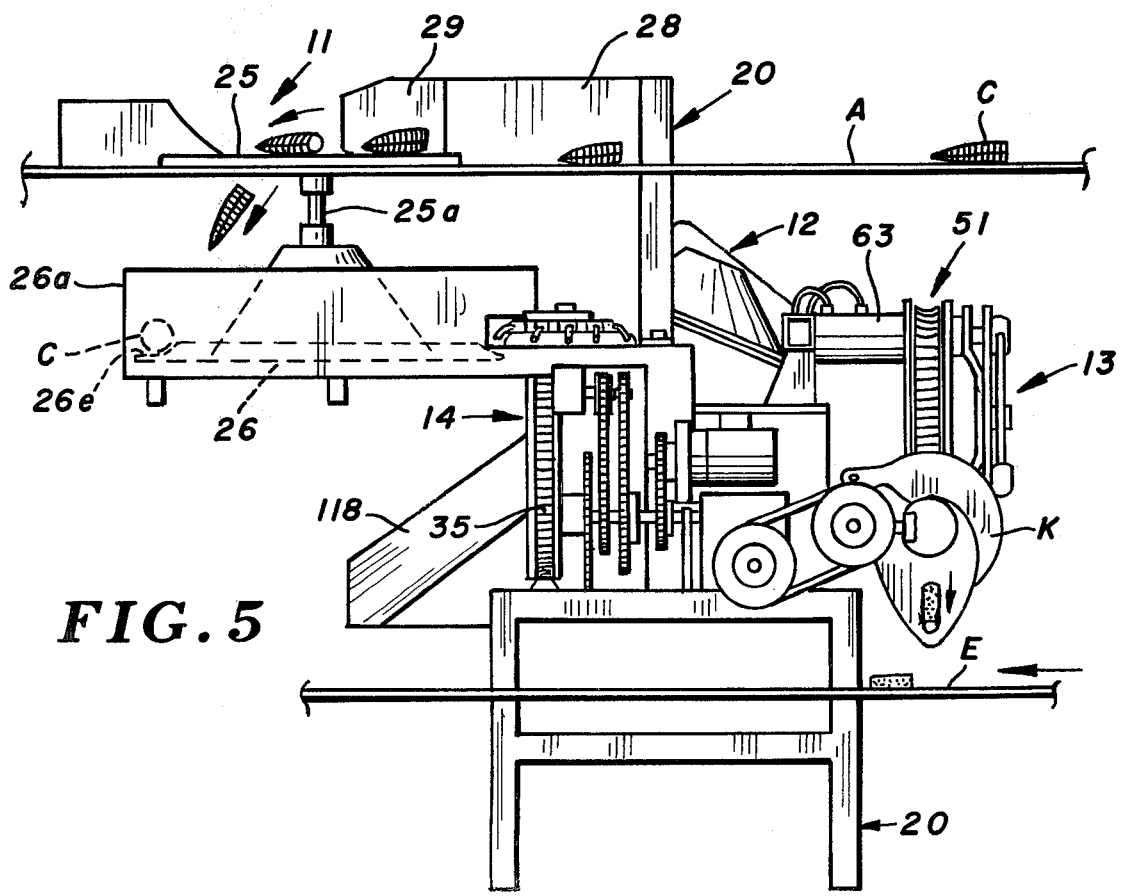
FIG. 5 is a view taken substantially along line 5—5 of FIG. 4 illustrating the end of the unit opposite that of FIG. 3.
Figure 9:
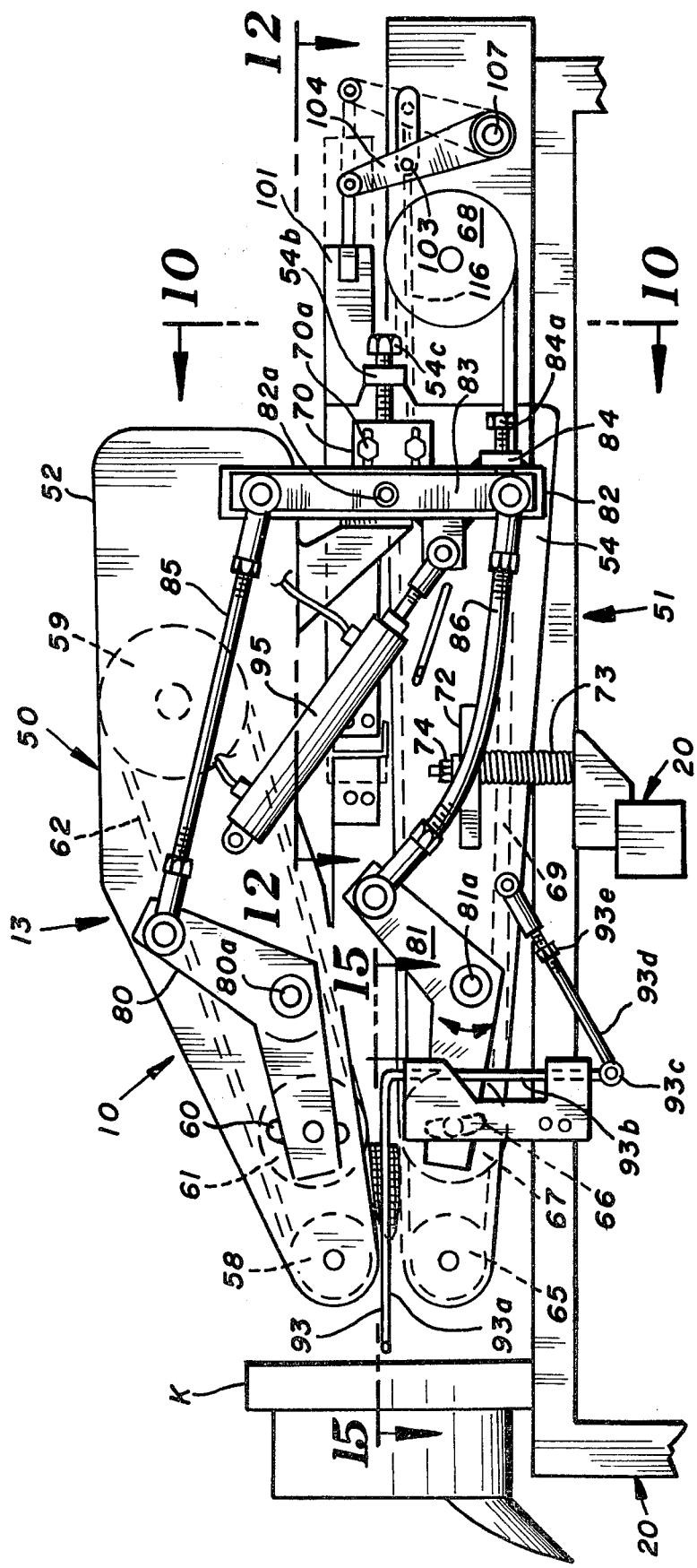
FIG. 9 is a vertical illustration taken substantially along line 9—9 of FIG. 1 to illustrate the arrangement for feeding the ears of corn after orientation and the feeding device which will feed the ears of corn into the kernel stripping unit.

The feed conveyor 13 is, as illustrated in FIG. 1, in substantially tangential alignment with wheel 45 and the structure thereof is best illustrated by the view of FIG. 4 wherein FIG. 4 is a general side view of the entire unit 10 and FIG. 9 is a view of the same area of the machine but being drawn to an enlarged scale to illustrate the mechanisms therein. The feed conveyor provides the final driving mechanism for the delivery of the ears C to the kernel cutter of knife K and insures the positive center line delivery thereof and this area includes several sensing systems which will be described in conjunction therewith.

Figure 15:
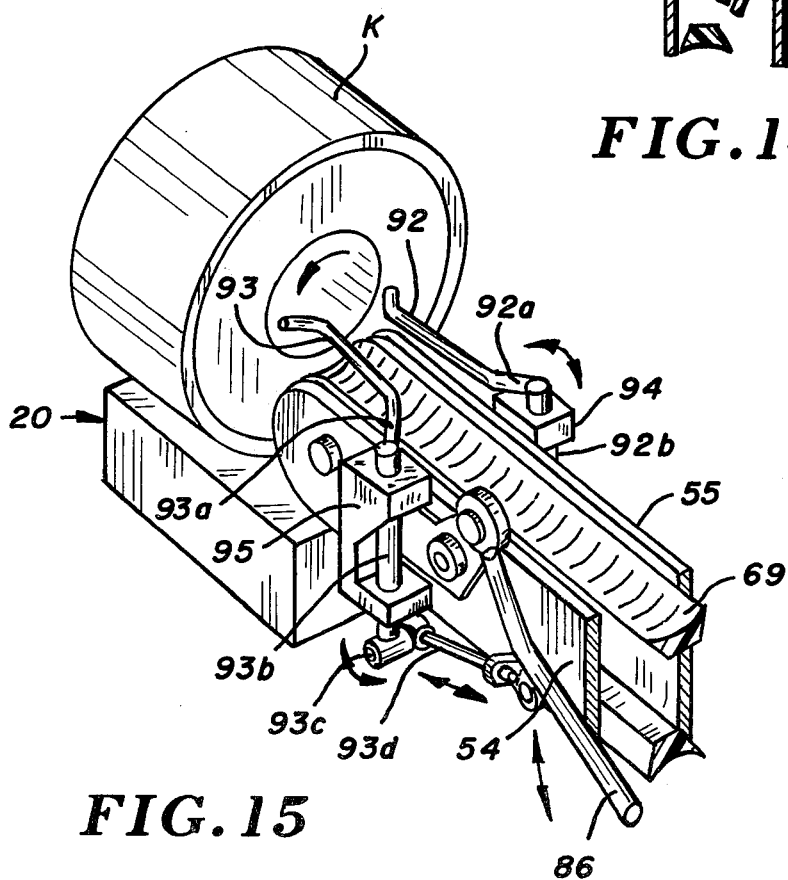
FIG. 15 is a horizontal section taken substantially along Line 15—15 of FIG. 9 which illustrates the mechanism controlling final entry of the ear of corn into the kernel stripping device and the various mechanisms that are arranged in accordance with the entrance of the ear of corn into the stripping device.

The entire structure of the feed conveyor 13 includes a pair of conveyor belts wherein the lower conveying belt structure is designated in its entirety 50 and the upper conveying belt portion is designated in its entirety 51. The entire concept of this feeding mechanism is to provide a positive directive force to the ears that are received from the orientation wheels 45, 46 and orientation ramp 47 to drive the same into the kernel cutting or stripping element K and which will, due to the various sizes and shapes of the ears, provide a positive gripping means for properly conveying the same. The unit 13 as described also will illustrate and discuss a pair of side sensing elements which are best illustrated in FIGS. 9 and 15 for final horizontal center-line positioning of ears from the upper and lower conveying elements. The side guide elements are designated 92, 93 and are coaxially linked to the upper and lower conveying elements 50, 51 as will be described hereinafter.

Each of the upper 50 and lower 51 conveyor members includes a pair of spaced, longitudinally extending support members 52, 53 and 54, 55 which are pivotally mounted through pivot members 56, 57 to the frame 20. These particular frame members 52, 53, 54, 55 are schematically illustrated in FIGS. 16 and 17 and the means for adjusting the same to bring the same into proper alignment with the kernel cutting device K is illustrated in FIGS. 11, 16 and 17.

As illustrated in FIGS. 9 and 16, a pair of pulleys 58, 59 are pivotally mounted on the upper support members 52, 53 and an arcuately formed groove 60 is arranged on said members for the mounting of a floating pulley 61 therein. An endless chain member 62 surrounds this set of pulleys and a drive motor 63 is utilized for driving the same. The endless chain member is preferably formed of individual plastic members which are concave in their ear contacting surface for proper driving of the ears of corn.

As also illustrated in FIGS. 9, 16 and 17, the lower conveyor member 51 includes what may be termed a nose wheel 65, similar to wheel 58 and includes an arcuate slot 66 for the mounting of a floating pulley 67. The third pulley of the lower conveyor member 51 is positioned on the frame 20 and is designated 68. An endless chain or conveyor member 69 surrounds these three pulleys 65, 67 and 68 and again this member may be concavely formed to present a large area of contact to the ear of corn being conveyed.

As particularly illustrated in FIG. 18, the endless chain or conveyor member 69 is arranged in substantially tangential relation to the wheel 46 of the orientation section 12 to receive ears of corn that have been properly oriented directly thereon for final delivery to the kernel cutter K.

The structure and method for initially positioning the nose wheels 58, 65 of the support members 52, 53 and 54, 55 is particularly illustrated in FIGS. 11, 16 and 17. As previously stated, the support members for carrying such nose wheels are pivotally mounted on the frame 20 through pivot members 56, 57. To initially align these nose wheels on a center line with the kernel cutter K, a factory standard bar is inserted into the cutter K and this bar extends towards the direction of feed of the ears. For proper operation of the unit, it is essential that the ears of corn be delivered on this established centerline and therefore, it may be necessary to initially align the nose wheels with respect to this centerline.

As illustrated in FIGS. 11, 16 and 17, the upper support member 52 is provided with a downwardly depending boss 52a and the lower support member 54 is provided with an upwardly directed boss 54a. A transversely extending boss 54b is provided on boss 54a and a threaded adjustment member is provided to extend therethrough, such member being designated 54c. A slotted adjustment and abutment member 70 is provided for sliding movement on the boss 54a with the forward end 70a thereof being convex. The downwardly depending boss 52a is also convexly formed as at 52b to abut with the adjustment and abutment member 70. Fastening members 70b are provided for securing the sliding member 70 in place after adjustment of the nose wheels 58, 65.

As illustrated in FIGS. 16 and 17, inward movement of the adjustment member 54c against the sliding member will cause the sliding member to move forward and will also cause the transversely extending boss 54b to move rearwardly. Such movement will cause the nose wheels 58, 65 to be moved upwardly. Backing off of the adjustment member 54c will cause the sliding member 70 to move rearwardly, and thus the support members and associated nosw wheels 58, 65 to move downwardly. The object of this adjustment movement is to position the nose wheels in centered relation with respect to the kernel cutter K.

As illustrated in FIGS. 4 and 9, the set of lower support members 54, 55 are provided with an outwardly extending boss 72 in overlying relation to a spring member 73, which spring member engages a portion of the frame 20 and which structure includes a tightening nut member 74 above the boss 72. This spring member and structure affords a means to set the gap between the nose wheels 58, 65. The minimum gap is provided to insure clearance of the side fingers 92, 93.

As previously stated, intermediate wheel members 61 and 67 are provided respectively on both the upper and lower support units. These wheel members are mounted for movement within the aforementioned arcuate slots 60, 66 so as to engage the lower run of the upper drive chain element 62 and the upper run of the lower drive chain 69. As illustrated in FIGS. 4 and 9 these, what may be termed contour wheels are positionable within the slots and are mounted for rotation respectively on a pair of lever members 80, 81 which lever members are pivotally mounted on the support members 52, 54 as at 80a, 81a. As illustrated in FIG. 11 a first mounting bar 82 is provided to be mounted on the bearing rods 56, 57 and in the chosen position for such bar, it is formed to overlie the adjustment block 70. A bearing member or mounting post 82a is provided in the center of such bar 82 and a contour wheel adjustment bar 83 is pivotally mounted thereon. A boss 84 is provided to extend outwardly from said first mounting bar 82 and an adjustment member 84a passes therethrough to abut with the contour wheel adjustment bar 83 for controlled movement thereof. Tie rod bars 85, 86 are respectively provided between the aforementioned upper lever 80 and the upper end of the adjustment bar 83 and the lower lever 81 and the lower end of the adjustment bar 83. These tie rod bars 85 86 provide for symettrical adjustment of the contour wheels 61, 67 against the factory standard bar and the gap between these wheels 61, 67 may be controlled by movement of the adjustment member 84a. As should be obvious, inward movement of the adjustment member 84a will cause the wheels 61, 67 to spread and retraction of the adjustment member 84a will cause the contour wheels 61, 67 to close upon one another.

The purpose of the contour wheels 61, 67 is to provide a proper gripping area for driving the ears into the kernel cutter K. The contour wheels will conform to the shape of the ear and maintain a two point control for the driving chains which will basically contact the ear on both sides thereof from the contour wheel area to the nose wheel area. It should be obvious that the nose wheels are also capable of spreading in response to the size of ear passing therebetween. This combination of wheels and chains then insures proper, center line delivery of the ear to the kernel cutter K.

In order to insure that the ear of corn being delivered will not shift sideways from the conveying mechanism prior to its delivery to the cutter K, an articulated set of fingers 92, 93, previously mentioned, are provided in close association to the cutter. These fingers are best illustrated in FIGS. 1 and 15. As illustrated therein, the fingers include longitudinally extending rod members having a vertical portion at the rearmost 92a, 93a ends thereof with the vertical portions 92b, 93b being mounted for rotation in support blocks 94, 95 attached to the support frame 20. The lower ends 92c, 93c of the vertical sections are connected through a ball-joint type of structure to a connecting link 92d (not shown), 93d which in turn is connected to the lower support members 54, 55. This connecting link is adjustable as shown at 93e in FIG. 9. As the lower support members 54, 55 are moved downwardly in response to the size of the ear being delivered to the conveyor, such lowering will cause the fingers 92a, 93a to spread in proportionate degree to open but to maintain a centering sideways force upon the ear. When the lower members 54, 55 have returned to what may be termed their preset or normal position, the fingers 92a, 93a will likewise return to their preset condition.

As illustrated in FIGS. 4 and 9, a cylinder 95 is provided between a frame portion and the upper support member 52, 53 and this cylinder is a double acting cylinder to normally maintain a biasing pressure upon the nose wheels and which will raise the upper support member 52, 53 for service. This service is automatically built into the unit and this cylinder will be activated after the unit has been actuated a number of selected times in reverse to clear itself of any jams of ears. This cylinder 95 may also be activated for normal service of the unit.

As previously stated, a drive motor is provided for the upper chain 62. A drive motor, which does not appear in any of the drawings due to its particular location, is provided to drive the pulley 68. When a jam of ears or other fault in the delivery portion 13 of the unit occurs, these motors are automatically reversed, automatically reengaged to forward drive and if the jam is not cleared by such action this reversing and forward drive cycle is reinitiated. After a preselected number of such cycles, cylinder 95 is actuated to lift the uppsupport unit for manual clearing of the jam.

Figure 14:
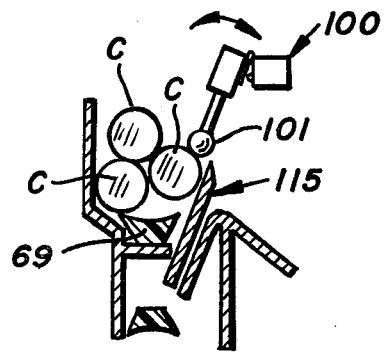
FIG. 14 is a vertical section taken substantially along line 14—14 of FIG. 12 which illustrates the control device determining the proper operation or jamming of the unit as ears of corn are being fed therethrough.

A typical jam situation is illustrated in FIG. 14. As illustrated therein, a microswitch 100 is located with respect to the conveyor belt 69 and should ears being delivered clog or ride up on one another as illustrated, the microswitch sensor 101 is tripped to initiate the rearward drive for the driving motors.

When jamming should exist and the conveyor chains 62, 69 are run in reverse direction, it is necessary to insure that no more ears are delivered to the conveyor chains. A combinative structure is provided to insure that no more ears will be delivered from the orientation section 12 and that any ears that are on the conveyor chains 62, 69 will be shunted from such chains. The particular structure of this arrangement is best illustrated in FIGS. 12, 13, 18 and 19.

As illustrated in such views, a cut-off member or shuttle 100 is positioned in normal side-by-side relation to the endless conveyor or belt and this shuttle 100 is pictured in two positions on FIG. 18 to illustrate the normal position adajacent the belt 69 when the same is being driven in a forward direction and the dotted line position substantially across the belt 69 when the belt is being driven rearwardly. As illustrated, the cut-off of shuttle 100 includes a flexible link member 101 pinned to an actuating lever 104 by pin 103. Means for actuating said shuttle is designated as cylinder 105 which is attached to link 101 and lever 104 through a lever and shaft combination 106, 107. As illustrated, a blocking member 102 is attached to the flexible link 101 at the end thereof and is angularly offset thereto and a pair of angularly arranged guide blocks 110a, 110b are provided on the side of the conveyor or belt 69 to guide the blocking member 102 when the same is pulled rearwardly by action of cylinder 105. Such action will then position the flexible link 101 across belt 69 to shuttle or cut-off flow of ears of corn from the orientation section 12 and direct the same laterally of the belt 69. The blocking section will be similarly drawn across belt 69 to block the rearward flow of ears of corn when the belt 69 is reversed and these ears will likewise be shuttled transversely across the belt for discharge therefrom.

Figure 13:
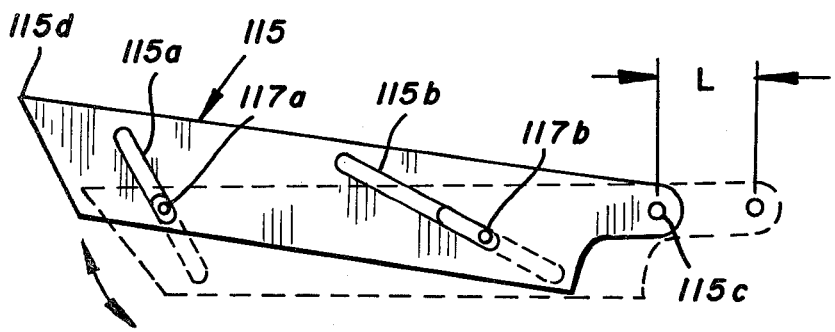
FIG. 13 is a section taken substantially along line 13—13 of FIG. 12 which illustrates the ear jam and return mechanism.

As illustrated in FIGS. 18 and 19, a side guide member 115 is positioned substantially across from the cut-off member 100 and the two positions of its operation are illustrated in FIGS. 13, 18 and 19. As illustrated in these various views, this guide member is provided with two slots 115a and 115b therethrough which slots engage pin members 117a, 117b which are arranged on frame 20 to position this guide 115 adjacent the endless belt 69. As illustrated, the rearward end of guide 115 is provided with a connection for attachment to an actuating rod 116 which extends rearwardly to lever member 104 for simultaneuously moving of the same when the shuttle or cut-off 100 is shifted into blocking position. The slots 115a and 115b are angled to horizontal at different positions. These positions will, when the guide 115 is drawn rearwardly, cause the forwardmost end 115d to be drawn downwardly to at least the level of the endless belt 69 to allow the ears of corn that are transversely shuttled by the cut-off mechanism 100 to drop from the side of the belt onto a recirculating chute 118.

The two described members, the cut-off 100 and the side guide 115 then normally serve as guides to hold and retain the ears of corn on the endless belt 69 as they are received from the orientation section 12 and are positioned on the belt until they reach the contour wheels and are grasped by the dual belt system whenever the belts are being driven in a forward direction but which will cause a lateral discharge of ears when the belts are driven in a rearward direction to clear jams or other malfunctions of the delivery section 13 of the unit.

The applicants have illustrated only one typical malfunction of the unit but it should be obvious that other malfunctions can occur in the delivery process. The cutter unit K may become jammed, for example and therefore reversing of the belts may clear such jam. Other malfunction sensing devices may be positioned along the delivery section 13 to determine other possible malfunctions which could possibly be cleared by reversing the belts to clear the delivery area of ears of corns and these signals are properly transmitted to, for example, the drive motors for the endless belts, the shuttle or cut-off and the side guid and the initially mentioned lever operating on the end of the shroud on the upper wheel of the pick-off section. The concept of this action and signalling being to prevent more ears from being delivered to the unit during a period of malfunction.

The operation of the unit should be obvious from a consideration of the previous description of the various elements of the unit. The operation, simply stated is to pick-off ears of corn that are being delivered in random orientation by a supply conveyor, deliver the same past a direction sensing device to establish the direction of orientation of the ear, primarily to determine that the smaller end of the ear is either forward or backward and to thereafter turn those ears that have the larger end directed forwardly such that they will enter the delivery portion of the unit and ultimately the cutter with the small end of the ear in the forwardmost position such that this smaller end will enter the kernel cutting device first. The sensing device will also determine whether the ear of corn is within the desired parameters of ears to be stripped of their kernels and if ears do not match such parameters, they will be discharged from the unit. The delivery section of the unit is primarily designed to insure that the ears of corn being delivered to the cutter are centered into the cutter opening to reduce possible clogging of the cutter. After stripping of the ear, the remaining cob is delivered to a remote location by conveyor mechanisms which are not a portion of this unit and likewise, the stripped kernels are delivered for further processing.

In use of this unit, a number of the same will be positioned in side-by-side relation along a supply conveyor.

It should be obvious that the applicants have provided a new and unique article orientation device that is particularly designed for the orientation of ears of corn but which may find equal useage for the orientation of other similar products such as carrots and the like.

What I claim is:

1. An article orientation device particularly for delivering tapered articles such as ears of corn from a conveyor transporting the ears in random fashion to a kernel cutting device with the ears being arranged in a determined orientation, said device including:
   a. a pick-off section for receiving and gathering ears of corn from the conveyor;
   b. a first conveyor means receiving ears from said pick-off section;
   c. a sensing station arranged in position adjacent said first conveyor means to determine the orientation of the ears carried by said conveyor means;
   d. an orientation section arranged and constructed to receive ears of corn from said first conveyor means and to selectively rotate the ears in end-to-end relation in response to a signal from said sensing station;
   e. second conveyor means receiving the oriented ears of corn from said orientation section and delivering the same to the kernel cutting device; and,
   f. said pick-off section including a pair of wheel members arranged in vertical relation to one another, the upper of said wheels being arranged in overlying relation to the supply conveyor to receive ears of corn therefrom and drop the same onto the lower of said wheels.

2. The structure set forth in claim 1 and means for driving said wheel members in a direction opposite to the direction of travel of the supply conveyor.

3. The structure set forth in claim 2 and said wheel members being arranged on a common center line, the speed of said wheels being individually controlled.

4. The structure set forth in claim 3 wherein the speed of said wheels is individually, selectively variable.

5. The structure set forth in claim 1 and first shroud means surrounding at least a portion of said upper wheel to retain ears of corn thereon and permitting the same to drop to said lower wheel.

6. The structure set forth in claim 5 and a lever member arranged at the end of said first shroud and means for shifting said lever to deflect ears of corn towards the center of said wheel upon actuation thereof.

7. The structure set forth in claim 6 and sensing means provided on said device to sense malfunctions thereof and actuating said lever member in response to malfunctions to prevent delivery of ears of corn to said lower wheel.

8. The structure set forth in claim 1 and:
   a. second shroud means surrounding said lower wheel;
   b. a delivery opening formed in said shroud; and,
   c. metering means arranged in position adjacent said delivery opeing for controlling the delivery of ears of corn to said first conveyor means.

9. The structure set forth in claim 8 and:
   a. said metering means including a chain member arranged exteriorally of said shroud, having a plurality of outstanding fingers thereon to extend inwardly of said shroud to contact and meter the delivery of ears of corn to said first conveyor means; and,
   b. means for driving said chain member.

10. The structure set forth in claim 9 and said shroud being generally circular in shape, and guide means for conforming the path of travel of said chain member to conform to the circular shape of said shroud.

11. The structure set forth in claim 10 and biasing means normally urging ears of corn against the extending fingers of said metering chain means.

12. The structure set forth in claim 1 and said lower wheel including a downwardly formed step about the periphery thereof.

13. An article orientation device particulary for delivering ears of corn from a supply conveyor transporting the ears in random fashion to a kernel cutting device with the ears being arranged in a determined orientation, said device including:
   a. a pick-off section for receiving and gathering ears of corn from the conveyor;
   b. an orientation section for orienting the ears delivered thereto to a desired orientation;
   c. means for deliverying the ears from said pick-off section to said orientation section;
   d. delivery means arranged and constructed to receive ears in proper orientation from said orientation section and deliver the same to the kernel cutting device, said delivery means including an upper and a lower, vertically spaced conveyor means for simultaneously engaging an ear of corn along at least selected portions thereof to drive same into the kernel cutter;
e. said conveyor means including a vertically spaced longitudinally extending support means;
f. an endless belt member;
g. at least a pair of pulley members pivotally mounted on said support means, said endless belt member surrounding said pulley mean;
h. means for driving one of said pulleys to drive said endless belt in both forward and rearward directions;
j. timed recycling means to control said driving means.

14. The structure set forth in claim 13 and means for elevating said upper conveyor means following a predetermined number of reversals.

15. The structure set forth in claim 13 and:
   a. cut-off means normally arranged adjacent said lower endless belt member when said belt is being driven in a forward direction; and,
   b. means for shifting said cut-off means across said endless belt to divert ears of corn being delivered from said orientation section and being returned from said cutter laterally from said belt when said belt is driven in a rearward direction.

16. The structure set forth in claim 13 and a shiftable side guide member arranged adjacent said lower endless belt member, said guide member being in an upward position when said belt is driven in a forward direction and being in a lowered position when said belt is driven rearwardly.

17. The structure set forth in claim 16 and said cut-off and said side guide members being interconnected and commonly shifted.

* * * * *